United States Patent
Gore

(10) Patent No.: US 9,707,600 B2
(45) Date of Patent: Jul. 18, 2017

(54) BOOT AND BICYCLE TIRE BATH

(76) Inventor: Barry Alan Gore, Washington, DC (US)

(*) Notice: Subject to any disclaimer, the term of this patent is extended or adjusted under 35 U.S.C. 154(b) by 1004 days.

(21) Appl. No.: 13/535,358

(22) Filed: Jun. 28, 2012

(65) Prior Publication Data

US 2013/0007978 A1 Jan. 10, 2013

Related U.S. Application Data

(60) Provisional application No. 61/504,270, filed on Jul. 4, 2011.

(51) Int. Cl.
*B08B 3/04* (2006.01)
*B60S 3/04* (2006.01)

(52) U.S. Cl.
CPC .............. *B08B 3/04* (2013.01); *B60S 3/041* (2013.01)

(58) Field of Classification Search
CPC ... A47L 17/02; A47L 19/04; A47K 1/04; A47K 3/022; A47K 3/024; A47K 3/062; B08B 3/04; B60S 3/041; E03C 1/14; E03C 1/18; E03C 1/182; E03C 1/186
See application file for complete search history.

(56) References Cited

U.S. PATENT DOCUMENTS

| | | | |
|---|---|---|---|
| 176,304 A * | 4/1876 | Harper | A47L 17/02 134/92 |
| 2,663,392 A | 12/1953 | Miller | |
| 3,064,296 A | 11/1962 | Lidke | |
| 4,014,060 A | 3/1977 | Taylor | |
| 4,024,599 A | 5/1977 | Gamboa | |
| 4,233,707 A | 11/1980 | Leblanc | |
| 5,073,997 A * | 12/1991 | Rabe | E03C 1/18 312/22 |
| 5,454,391 A * | 10/1995 | Cheung | B60S 3/042 134/123 |
| 5,950,269 A | 9/1999 | Openshaw et al. | |
| 5,996,160 A | 12/1999 | Pruitt | |
| 6,651,288 B1 | 11/2003 | Hackett | |
| 7,114,212 B1 | 10/2006 | Watts | |
| 7,178,680 B2 | 2/2007 | Botner | |
| D543,318 S | 5/2007 | Bohnen et al. | |
| D551,811 S | 9/2007 | Bohnen et al. | |
| D555,302 S | 11/2007 | Bohnen et al. | |
| 7,500,488 B1 | 3/2009 | Long | |

(Continued)

OTHER PUBLICATIONS

Blue Level GmbH, Boot Washer With Draining Basin, publication date unknown (retrieved Jun. 19, 2012 <www.schuhputzmaschine.ch/en/Boot_washer_with_draining_basin.html>), USA, see pp. 1-3.

(Continued)

*Primary Examiner* — Michael Barr
*Assistant Examiner* — Spencer Bell
(74) *Attorney, Agent, or Firm* — Panovia Group LLP

(57) ABSTRACT

A boot and bicycle tire bath and method of using the same for facilitating the removal of undesirable material, such as from rubber or synthetic material, including cleaning snow and ice with grit from the soles of footwear and/or the tires of bicycles. Footwear may be dipped in a fluid in the bath, removing grit and other material, and thereafter left to dry on optional heel and/or toe holds. A bicycle tire, optionally supported by spaced apart rollers, may likewise be rotated through the fluid for cleaning.

12 Claims, 12 Drawing Sheets

(56) References Cited

U.S. PATENT DOCUMENTS

| | | | |
|---|---|---|---|
| 7,766,174 B2 | 8/2010 | Abraitis | |
| 2001/0023939 A1* | 9/2001 | Smith | B60S 3/041 |
| | | | 254/88 |
| 2005/0205499 A1 | 9/2005 | Botner | |
| 2008/0066226 A1* | 3/2008 | Elsinger | E03C 1/33 |
| | | | 4/643 |
| 2008/0314417 A1* | 12/2008 | Porter | B08B 3/006 |
| | | | 134/34 |
| 2010/0307531 A1* | 12/2010 | Aharonov | B60S 3/041 |
| | | | 134/6 |

OTHER PUBLICATIONS

Greelyman, Best Boot Cleaner in the World Guaranteed, publication date unknown (retrieved Jun. 19, 2012 <greelyman.com>), USA, see pp. 1-6.

Greelyman, Home Boot Cleaner HM2, publication date unknown (retrieved Jun. 19, 2012 <greelyman.com/buy/index.php?cmd=products[]_id=2>), USA, see pp. 1-2.

Ehow, How to Clean Timberland's Boots, publication date unknown (retrieved Jun. 19, 2012 <www.ehow.com/how_4913224_clean-timberland_s-boots.html>), USA, see pp. 1-2.

Boot-Boy, Boot-boy Industrial Footwear Cleaner, publication date unknown (retrieved Jan. 12, 2013 <www.amazon.com/dp/B003B44ZCQ/?tag=jimidv-20>), USA, see pp. 1-2.

Lambert & Lambert, Inc., Invention/Technology Evaluation Results, dated Aug. 24, 2011, unpublished, see pp. 1-14 (attached patents omitted), applicant personal data redacted.

Sturm & Fix, LLP, Search and Patentability Opinion—"Boot Bath," dated Sep. 16, 2011, unpublished, see p. 1, applicant personal data redacted.

* cited by examiner

BOOT AND BICYCLE TIRE BATH

CROSS-REFERENCE TO RELATED APPLICATIONS

This application claims the benefit under 35 U.S.C. §119 (e) of U.S. Provisional Application 61/504,270, filed Jul. 4, 2011, which is hereby incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Field of the Invention

The invention relates generally to apparatus for cleaning footwear, tires and the like. More specifically, the invention relates to a container adapted to hold a fluid for facilitating cleaning and removal of undesirable material from shoes, boots, etc. and/or bicycle tires. More specifically still, the invention may be particularly suited to removing frozen material such as snow and ice and associated grit, sand, salt, etc., as might commonly be collected on footwear and/or tires in a cold, snowy climate.

Description of the Related Art

It may be desirable in various environments to clean items used outside upon return inside. In particular, with respect to footwear, various boot and shoe cleaners are known in the art. Many of these involve complex mechanical devices operating under electrical power. U.S. Pat. No. 5,950,269 to Openshaw et al. describes an electrically powered boot and shoe cleaner having a platform having scraper elements and fixed brushes at its sides, over a container of water having a motorized rotating brush. The rotating brush cleans the bottom of a sole, while the fixed brushes clean the sides.

U.S. Pat. No. 7,114,212 to Watts, recognizing the desire to obviate the need for an electrical power supply, describes a boot cleaning device having a base including a pair of cleaning pads and a rotating cleaning assembly. Rather than electricity, the assembly rotates under the power of a connected water supply acting against an impeller attached to the assembly.

U.S. Pat. No. 6,651,288 to Hackett describes a shoe sole cleaner box having high pile, thick tufted carpet on a base, for cleaning and drying shoes by a passing wearer, without the wearer removing her shoes.

The novel cleaning apparatus of the invention described herein may offer various benefits and conveniences to users, depending on a particular embodiment and application.

SUMMARY OF THE INVENTION

The invention is a boot and bicycle tire bath and method of using the same for facilitating the removal of undesirable material, such as from rubber or synthetic material, including cleaning snow and ice with grit from the soles of footwear and/or the tires of bicycles. Footwear may be dipped in a fluid in the bath, removing grit and other material, and thereafter left to dry on optional heel and/or toe holds. A bicycle tire, optionally supported by spaced apart rollers, may likewise be rotated through the fluid for cleaning.

In one aspect, the invention is a combination footwear and bicycle tire cleaning apparatus and method, which may include a basin for containing fluid, heel and/or toe holds having raised ridges, dip barriers, handles, a fill line and/or a spout.

In another aspect, the invention is an apparatus and method for cleaning tires, having an enclosure for containing a fluid, and which may include rollers for easing support and rotation of a tire during cleaning.

In yet another aspect, the invention is an apparatus and method for cleaning footwear, having a basin and a platform with a grid, and which may permit a user to walk thereupon during a cleaning process.

Additional features and advantages of the invention will be made apparent from the following detailed description that proceeds with reference to the accompanying Figures.

DETAILED DESCRIPTION OF THE INVENTION

Figure 1A:
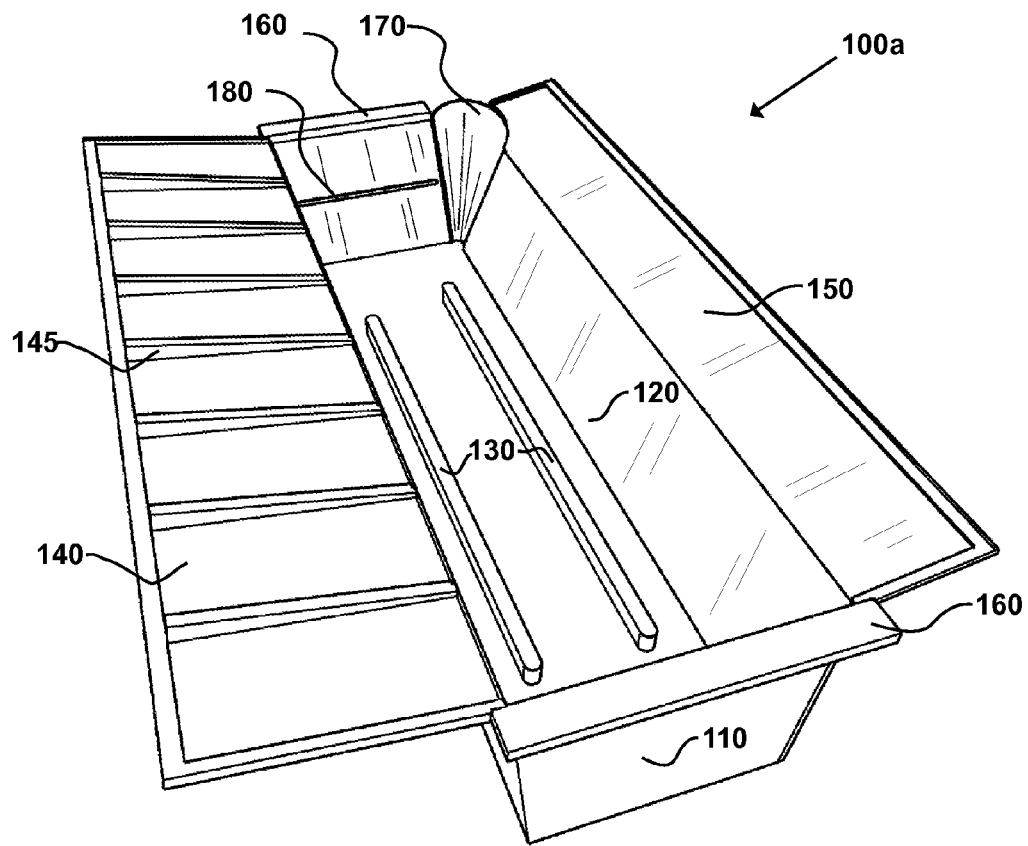
FIGS. 1A and 1C are perspective views of a boot and bicycle tire bath in accordance with the invention.

In the following detailed description of the invention, reference is made to the figures, which illustrate exemplary specific embodiments of the invention. It should be understood that varied or additional embodiments having different structures or methods of operation might be used without departing from the scope and spirit of the disclosure.

In general, the inventions are a variety of implementations of containers for supporting a fluid for facilitating removal of undesirable matter from the likes of shoes, boots, tires and other objects, and methods for using the same. Such objects may, for example, collect foreign material during use outside, and be desirably cleaned upon entry inside, among other scenarios.

The invention variously includes a product and a process for quickly cleaning snow and ice with grit from the soles of boots and/or the tires of bicycles. An embodiment of a Boot and Bicycle Tire Bath™, Boot Bath™, or simply bath herein for short (which terminology is not limited to the specific features of any particular embodiment), is illustrated in varying views by FIGS. 1A-1C as a bath 100 (differing views of which are denoted 100a, 100b, 100c). In this embodiment, the bath 100 includes an enclosure 110 that is substantially rectangular at its base and of a size to receive at least the largest standard-size snow boot, for example. The enclosure 110 may further be chosen such that it can receive a standard bicycle tire in a substantially parallel position along its length (i.e., can receive at least a lower portion of the circumference of the tire, as it is not necessary that 50% of the tire fit within the bath 100 such that the enclosure 110 would need to accommodate a full diameter of the tire).

In one embodiment, an enclosure 110 of approximately 22 inches has been found to adequately accommodate a sufficient portion of a 700 mm (27.6 inch) tire. Of course, many different embodiments are contemplated, and an optimal design may depend upon a variety of factors, such as a particular implementation, the particular objects to be treated, whether the enclosure 110 includes a trough (disclosed herein), etc., among a number of other variables. Depending upon an application, the length of an enclosure 110 in accordance with the invention may further be chosen to be long enough to provide space for at least two pairs of large boots to dry when placed perpendicular to the length of the enclosure 110, as discussed in greater detail herein.

The enclosure 110 may be made of a waterproof material, such as a durable plastic. For ease of manufacturing, the enclosure 110 may be formed from a single molded piece of suitable material. The enclosure 110 in this embodiment includes a fluid-filled (as with water, during use) basin 120, with dip barriers 130 optionally provided at the bottom. The dip barriers 130 may further act as guides for positioning a bicycle wheel during cleaning. The enclosure 110 is also illustrated as having a heel hold 140 and a toe hold 150 that may also act as drip pans. In an embodiment having a heel or toe hold, depending upon such factors as a particular implementation, a material from which a bath 100 is formed, etc., the enclosure 110 may further be reinforced, as by supports 155 illustrated by FIG. 1C.

Figure 1B:
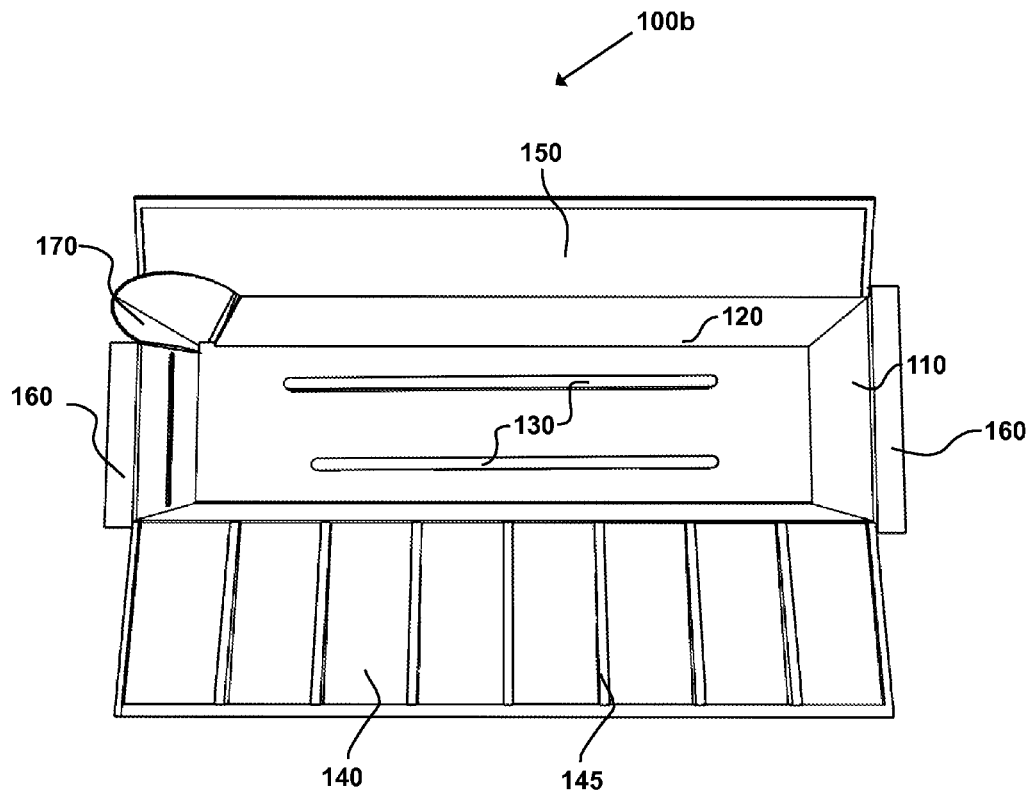
FIG. 1B is a top view of a boot and bicycle tire bath in accordance with the invention.
Figure 1C:
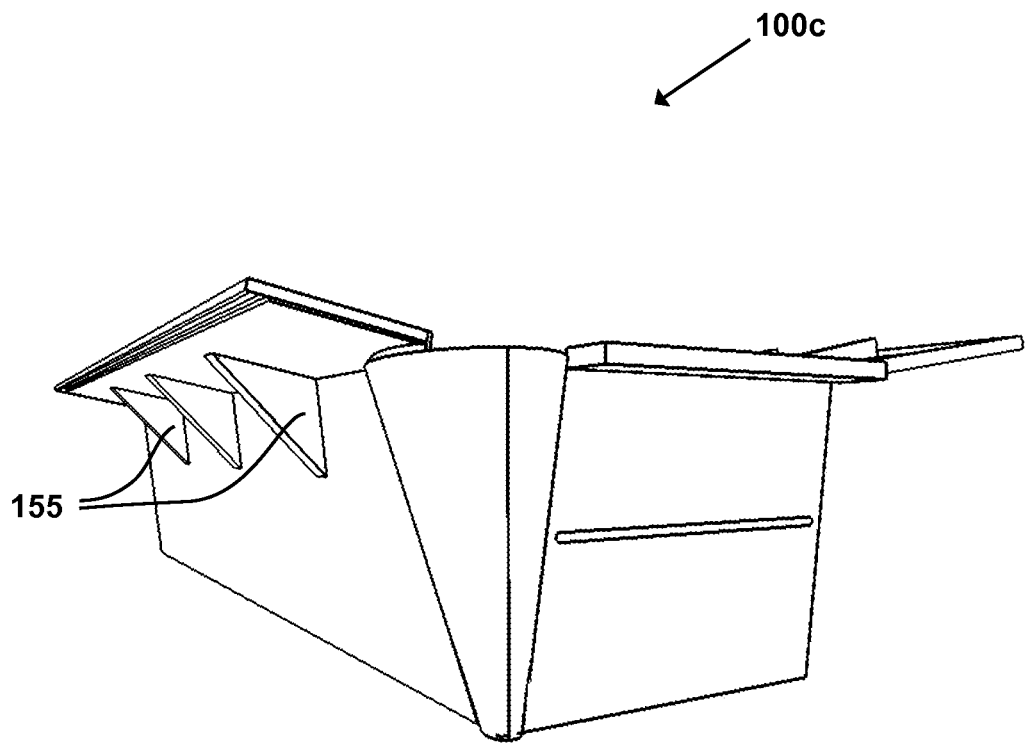

Additional optional features of a bath 100 in accordance with the invention include handles 160, two of which are shown molded to the sides of the enclosure 110 in the embodiment of FIGS. 1A-1C. The enclosure 110 may further include a pouring spout 170 formed in a side of the enclosure 110 or, as illustrated, in a corner of the fluid basin 120. A spout 170 may be positioned and formed to further add to the length of the enclosure 110, at least at an upper portion, in order to better receive larger bicycle wheels. The addition of water or other appropriate fluid allows the product to be used according to the process disclosed herein, in accordance with the invention.

In operation, a Boot Bath in accordance with an embodiment of the invention is adapted for cleaning snow and grit from the soles of boots, shoes and/or bicycle tires and optionally providing a platform for air drying boots and shoes. Specifically, the Boot Bath may be used to clean tread on the underside of boot and shoe soles. A boot with a molded tread on its sole caked with snow, ice, sand, grit, and other material picked up in typical use during winter snow conditions, for example, may be cleaned by dipping a single boot into the water basin so that the sole, typically of rubber or any of various synthetic materials, is submerged. The natural buoyancy of typical boot soles, as well as the surface tension of the water, creates a resistance to complete submersion of the boot, in most cases. The temperature difference between the snow and ice on the sole tread and the water in the basin causes the snow and ice to quickly melt, often in one to three brief dipping cycles. The water content of the snow and ice is added to the fluid in the basin, while heavy material in typical road grit, primarily sand, quickly sinks to the bottom of the basin.

While not required for the bathing processes described herein, dip barriers 130 at the bottom of the water basin may help to separate grit material in the water column by creating separation between an inserted item of footwear and a bottom of the basin 120. The dip barriers 130 may be positioned parallel to or perpendicular to a long side of the basin 120, angled diagonally from corner to corner of the box (see e.g., grid lines 230 in FIG. 2A), etc., and may take any of a variety of shapes and sizes (long bars, raised repeating pattern, crisscross design, etc.) The dip barriers 130 may guide positioning of a bicycle wheel and/or may, depending on their shape, facilitate the movement of sand and other grit toward the optional spout 170 without impediment as water is poured out during cleaning of the bath 100, among other potential benefits.

On either side and at the top of the water basin 120, a drying platform may be provided in the form of heel hold 140 and/or toe hold 150 that may also act as drip pans or guides, as described herein. In one embodiment, the bath 100 is designed to be used such that the pan closest to the user is a heel hold 140 for holding the heel of boots, while the smaller platform on the other side of the basin is toe hold 150.

Boots may be placed perpendicular to the length of the water basin 120 after they have been dipped to allow water to drip from the boots either directly into the water basin or onto the heel and/or toe holds, which are angled toward the water basin 120 to direct water to run from the drying platforms down into the water basin 120. The heel hold 140 may further be adapted with hold ridges 145 molded into its surface in order to lift boots above the surface by minimizing points of contact and aid drying by allowing air to circulate across the surface of the boot soles. A distance between the hold ridges 145 may be chosen to be less than the width of a standard boot, to provide consistent separation between the footwear and the heel hold 140. The toe hold 150, which may be shorter, may also have ridges to aid in drying, however given the generally smaller points of contact between the boots and the toe hold 150, these ridges may desirably be omitted, depending on a particular application.

In an embodiment in which a length of the bath 100 is utilized to receive a tire, a pouring spout 170 may further be molded into a side of the basin 120. As shown in FIGS. 1A-1C (among others), the spout 170 may be formed in an upper (more distant) left corner, relative to the user, of the water basin 120, to provide a means for smoothly pouring water and stored grit materials from the basin into a toilet, bathroom shower drain, etc. The shape of the pouring spout 170 may further be adapted to the shape of a typical bicycle wheel and tire, with the extension of the water basin 120 by the spout 170 providing addition length across the water basin 120 to fit a larger bicycle wheel, e.g., 700 mm.

Regardless of its location (e.g., at a corner, along a side, etc.), the pouring spout 170 may further act as a guide for the wheel and tire, indicating to a user the preferred alignment for dipping the wheel and tire. In an embodiment in which a spout 170 is located along, for example, a short side of the enclosure 110, the sides as well may be pitched slightly outward from a bottom edge toward a top edge, to further facilitate removal of fluid and accompanying material after an appropriate number of uses. Snow, ice, and grit caked onto a bicycle tire and wheel by riding in winter snow conditions, for example, is cleaned from the tire by dipping the wheel and tire into the water basin and turning the wheel while it is at least partially submerged. The difference in temperature between the snow and ice and the water in the basin 120 melts the snow as the wheel is turned in the basin 120, and the water cleans grit from the tire tread.

An enclosure 110 of the bath 100 may further be formed or provided with handles 160, e.g., on the short sides of the box, to facilitate carrying the Boot Bath and for use when tipping the bath 100 to pour the water out. A water fill line 180 may be provided on the inside of the water basin 120 to indicate a normal, safe water level for the use of the Boot Bath.

Typically, footwear is allowed to dry over the open water basin 120, thereby allowing air to circulate freely around the surface of the boot sole. A cover can also be closed and boots placed on top of the cover for drying. A primary function of the cover is to keep items from falling into the water basin, and to keep young children and animal pets from drinking or splashing in the water, etc. Depending upon the application, the cover may not be designed to create a waterproof seal but rather a simple barrier to access to the water basin 120.

As described herein, a bath in accordance with the invention might include a cover as an optional attachment to the enclosure that partially or fully covers the water basin, whether to block pets or children from accessing water from the basin, for aesthetic purposes, for providing a partial or full platform for drying objects that have been cleaned, etc. The cover may be designed to be of sufficient width and length to block access to the water basin, and/or may include a gap or grooves to allow water, melting snow or other material to drip onto the cover and drain into the basin. The cover may be molded of the same material as the enclosure.

Figure 2A:
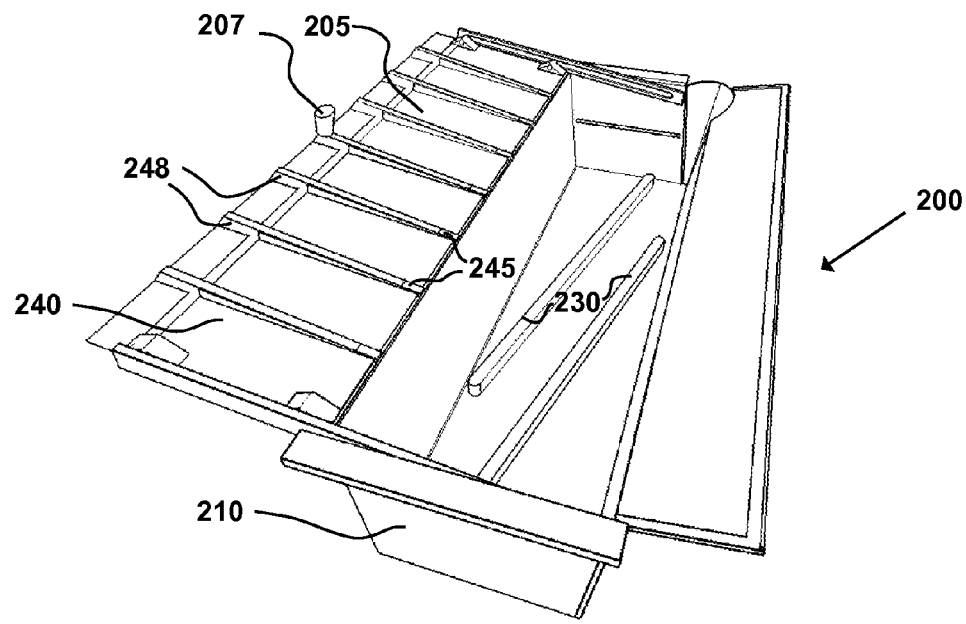
FIGS. 2A and 2B are perspective views of a bath having a cover in accordance with the invention.
Figure 2B:
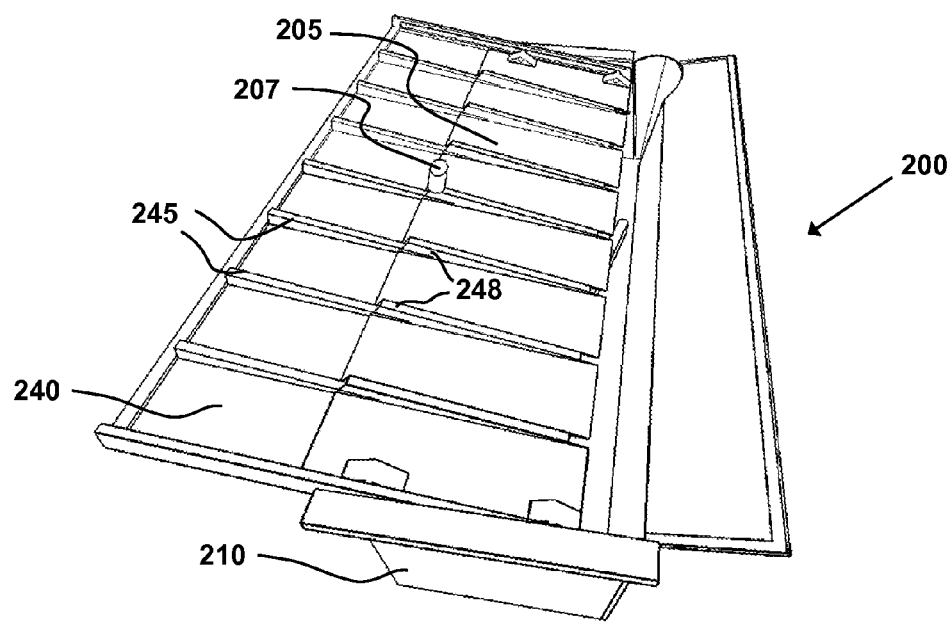
Figure 3:
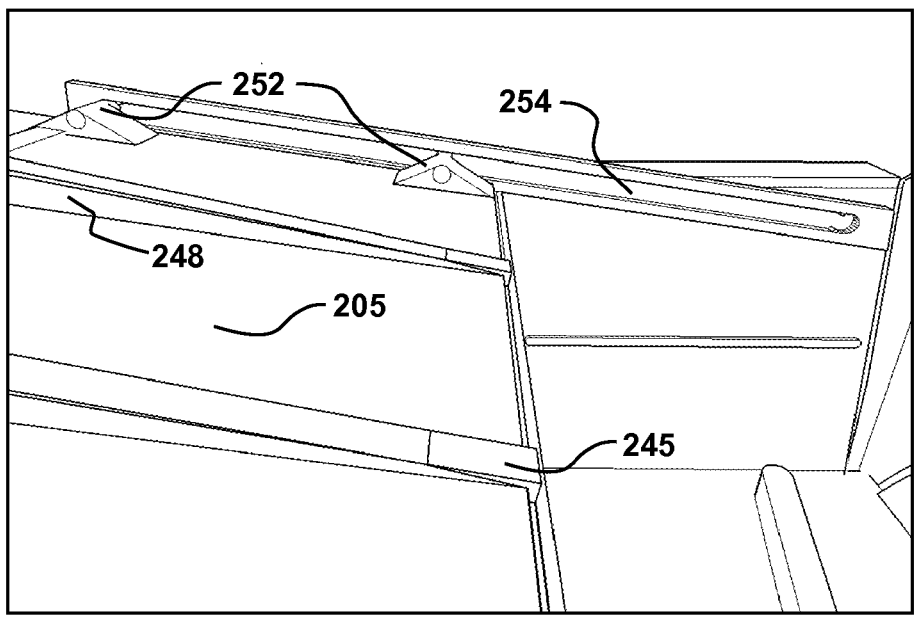
FIG. 3 is a detail view of a cover support mechanism in accordance with the invention.
Figure 4A:
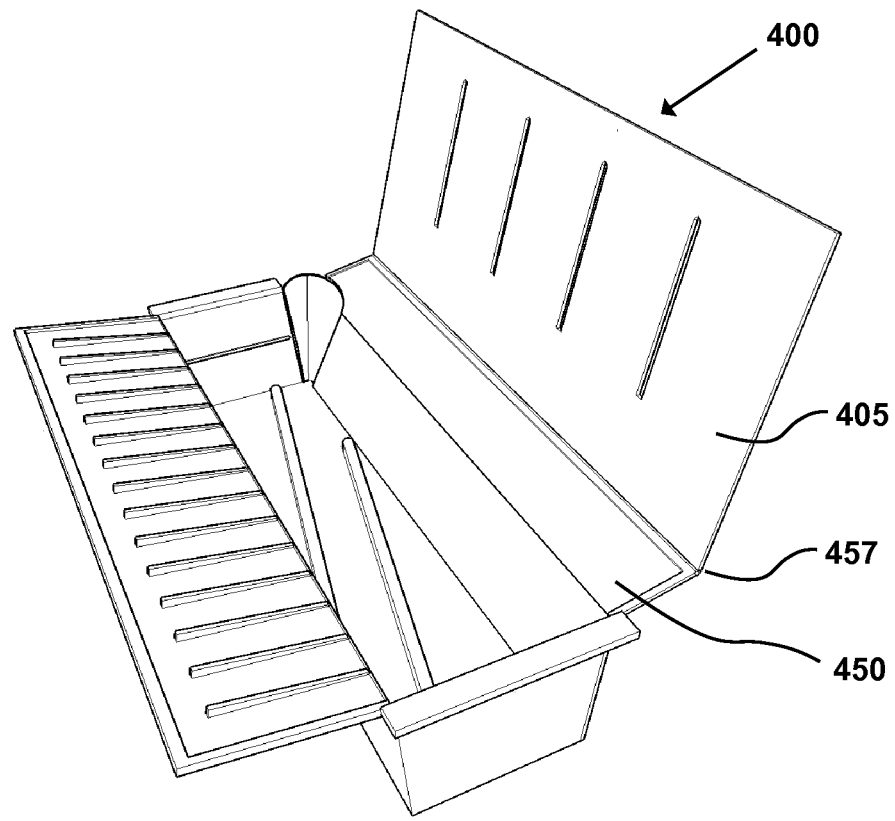
FIGS. 4A and 4B are perspective views of a bath having an alternative cover in accordance with the invention.
Figure 4B:
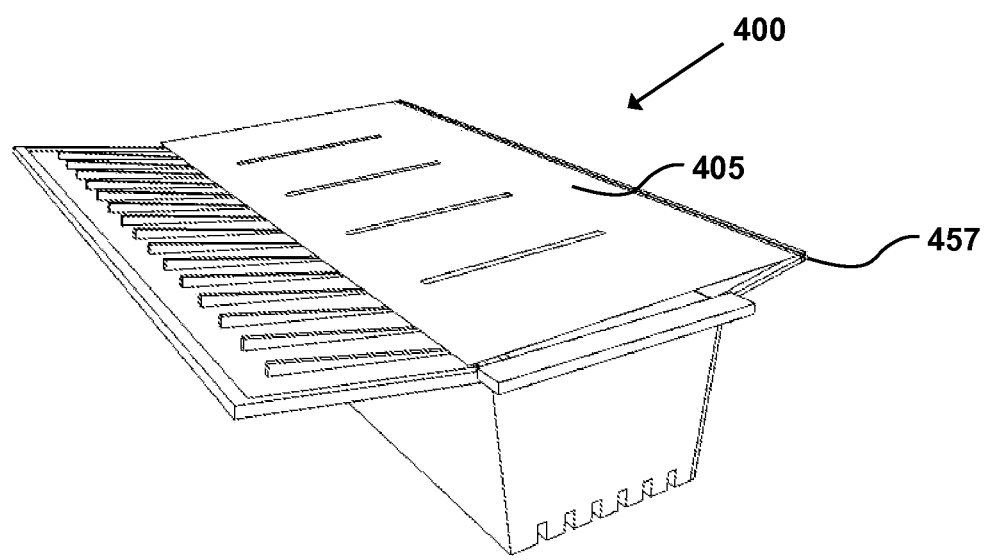
Figure 5A:
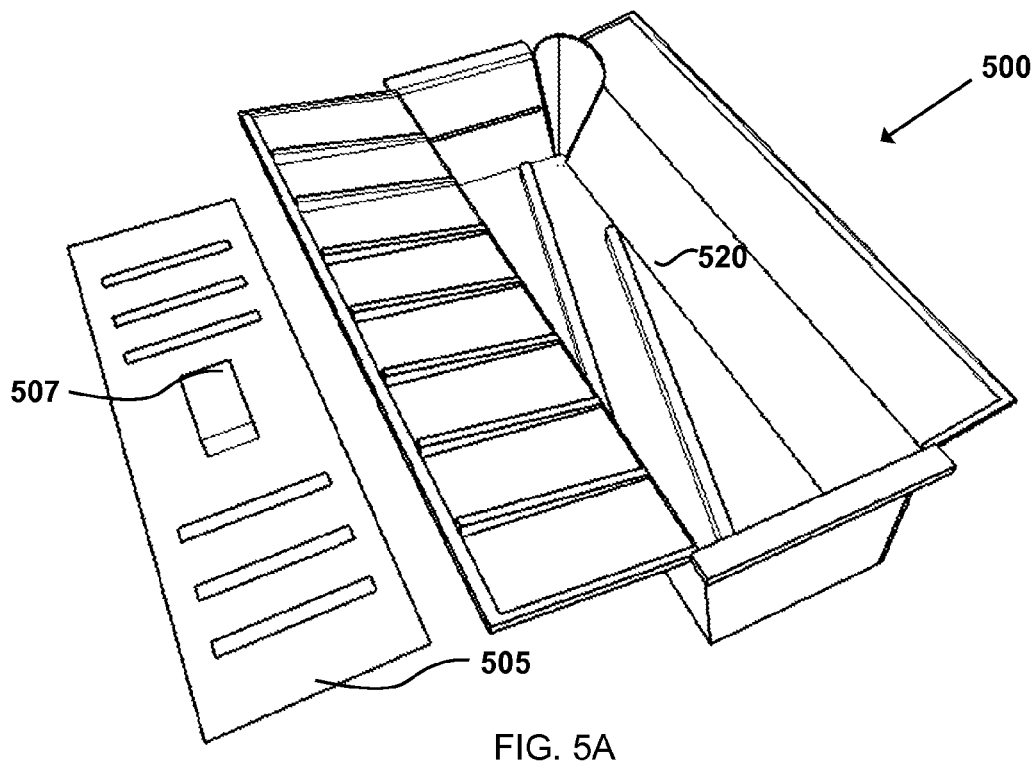
FIGS. 5A and 5B are perspective views of a bath having an alternative cover in accordance with the invention.
Figure 5B:
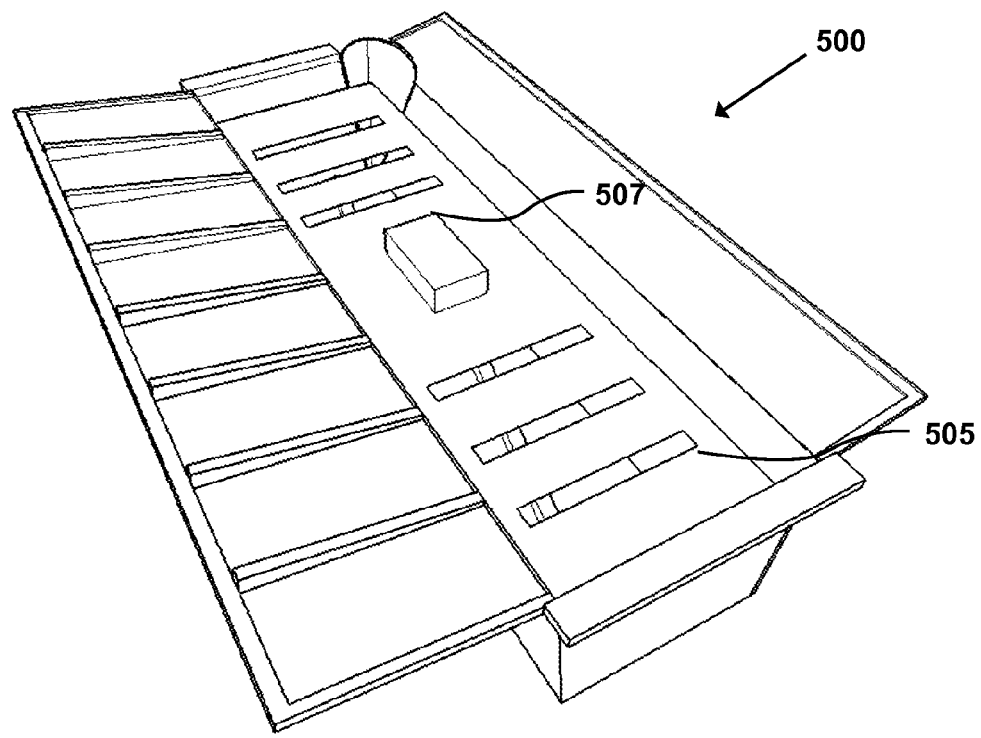

A number of embodiments of covers are contemplated for use with a bath in accordance with the invention, as are various means for fitting and attaching the cover to an enclosure. FIGS. 2A-2B, 3, 4A-4B and 5A-5B illustrate three possible options for the cover. FIGS. 2A-2B illustrate a bath 200 having a cover 205 that sits on top of and covers the heel hold, and may further be at the same angle as the heel hold and have cover ridges 248 that correspond to and mate with hold ridges 245 of the heel hold 240. The cover 205 may therefore slide across the opening of the water basin to partially or fully close the opening (see FIG. 2B), and may include a handle 207 for ease of moving the cover 205 between open and closed positions. Footwear may be placed upon the bath 200 with the cover 205 open or closed. When used in an open position, the cover 205 may overlay the heel hold 240 and serve the same supportive purpose. The cover 205, as shown in partial detail view in FIG. 3, is supported by cover holds 252 and guided by cover guides 254, which may be molded as part of the cover and walls of the enclosure, respectively. FIGS. 4A and 4B illustrate a bath 400 having a cover 405 attached to the box at the top of the toe hold 450 with a simple hinge 457, one half of which is molded into the enclosure and the other half molded into the length of the cover 405, potentially such that the cover 405 is removable. FIGS. 5A and 5B illustrate a bath 500 having a separate cover 505 having a handle 507, and which fits into an upper part of the water basin 520.

Figure 6A:
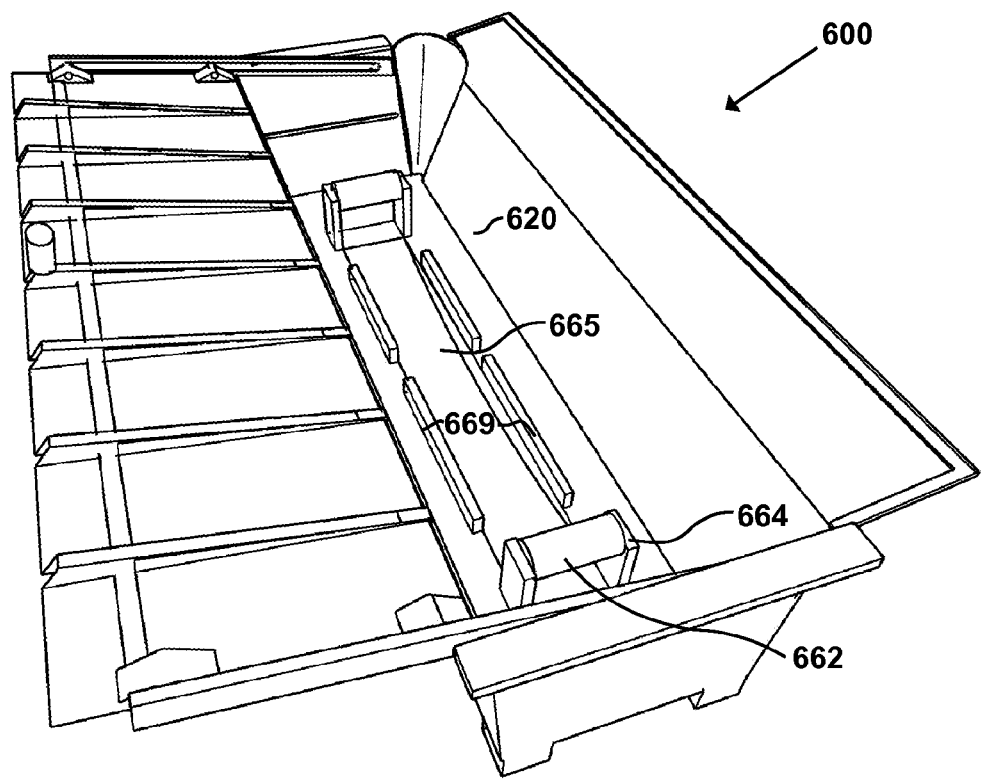
FIG. 6A is a perspective view illustrating a bath having rollers and a trough in accordance with the invention.
Figure 6B:
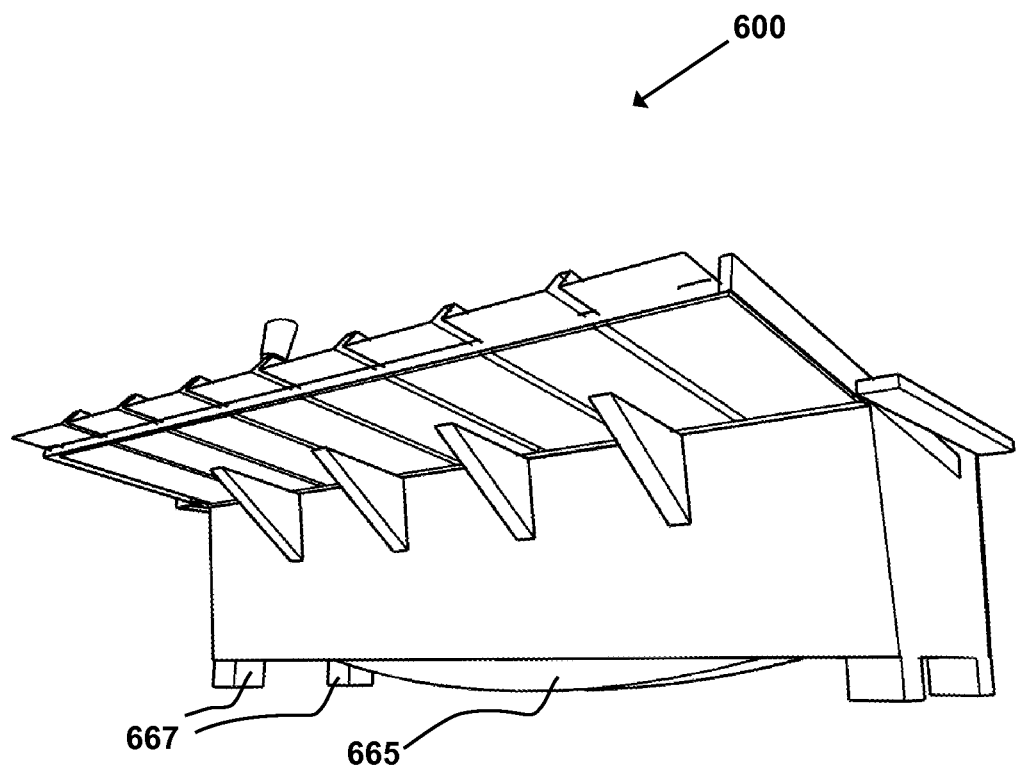
FIG. 6B is a perspective view illustrating a bath having a trough in accordance with the invention.

As with each embodiment disclosed herein, features may vary widely depending upon a particular implementation or application of the invention. In one embodiment, a basin 600 is further adapted to include rollers 662, positioned at either end of the basin 620 and supported by brackets 664, as illustrated by FIG. 6A. The rollers 622 are shown on a base of the basin 620, however may be positioned to receive a tire anywhere along its lower curvature when in a position to be cleaned. The rollers 662 may facilitate support of the tire (see e.g., tire 701 in FIG. 7) upon placement in the basin 620. During cleaning, the rollers 662 may further ease cleaning of the tire, preventing the tire from contacting a bottom of the basin 620, thereby reducing frictional resistance to rotation of the tire. FIGS. 6A and 6B further illustrate another optional adaptation as a trough 665, for increasing a downward reach of a select portion of the floor of the basin 620, thereby increasing a depth of water experienced by a tire positioned to rest or rotate through that portion. Although illustrated in FIG. 6B as having a curved surface to receive a similar curve of a bicycle tire, the trough 665 may be formed from adjoining flat surfaces, such as for ease of construction, among other designs. In an embodiment in which a trough 665 extends beyond an otherwise flat bottom of the basin 620, it may further be desirable to elevate the bottom away from a surface upon which it rests, such as by using a set of feet 667 (See FIG. 6B) or other such suitable adaptation.

In one embodiment, a bath 600 includes a trough 665 that increases a depth of the basin 620 by ¾ of an inch at its deepest point, and is adapted with corresponding feet 667 of the same ¾ of an inch. Dip barriers 669 may further be provided to prevent a dipped boot from reaching the bottom surface of the basin 620, but rather maintaining at least a slight separation therefrom.

In one embodiment, the rollers 662 are approximately 2 inches wide and approximately 2 inches removed from a bottom surface of the basin 620, though much variation is contemplated. Rollers 662 might be permanently fixed within the basin 620, or removable. In other applications, the rollers 662 might be adjustable for height and/or distance between them, allowing the basin 620 to be adapted to varying sizes of tire. In still other applications, the rollers 662 might be fully removable, such as where use with a bicycle tire might be less frequent or inconsistent.

Figure 7:
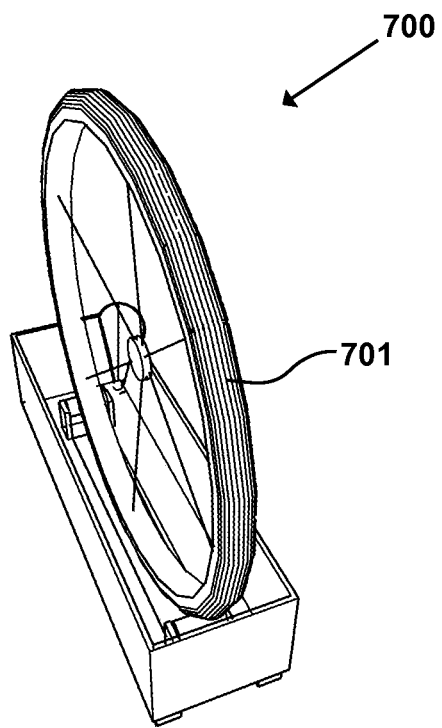
FIG. 7 is a perspective view illustrating a bath adapted for use with a bicycle tire in accordance with the invention.

In one embodiment, illustrated by FIG. 7, a bath 700 is adapted primarily for use with bicycle tires. In particular, the bath 700 may be designed to have a greater ratio of length to width, i.e., be narrower, to more efficiently receive a similarly narrow tire 701 and, in an application not intended to be used with footwear, heel and toe holds disclosed herein may be omitted. As disclosed herein, the bath 700 may be further be provided with a set of rollers or other adaptation to facilitate support and rotation of the tire 701 during cleaning.

Figure 8A:
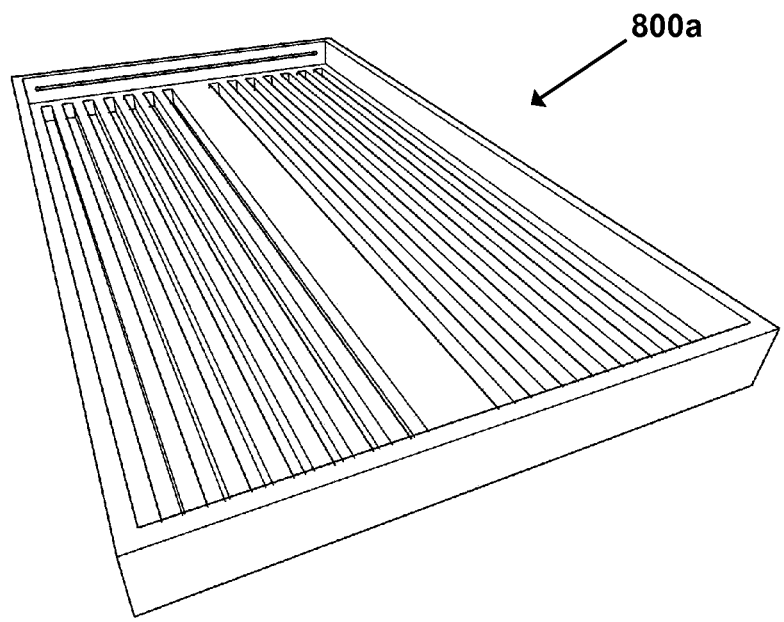
FIGS. 8A, 8B and 8C are perspective views illustrating a bath adapted for use in a high-traffic environment in accordance with the invention.
Figure 8B:
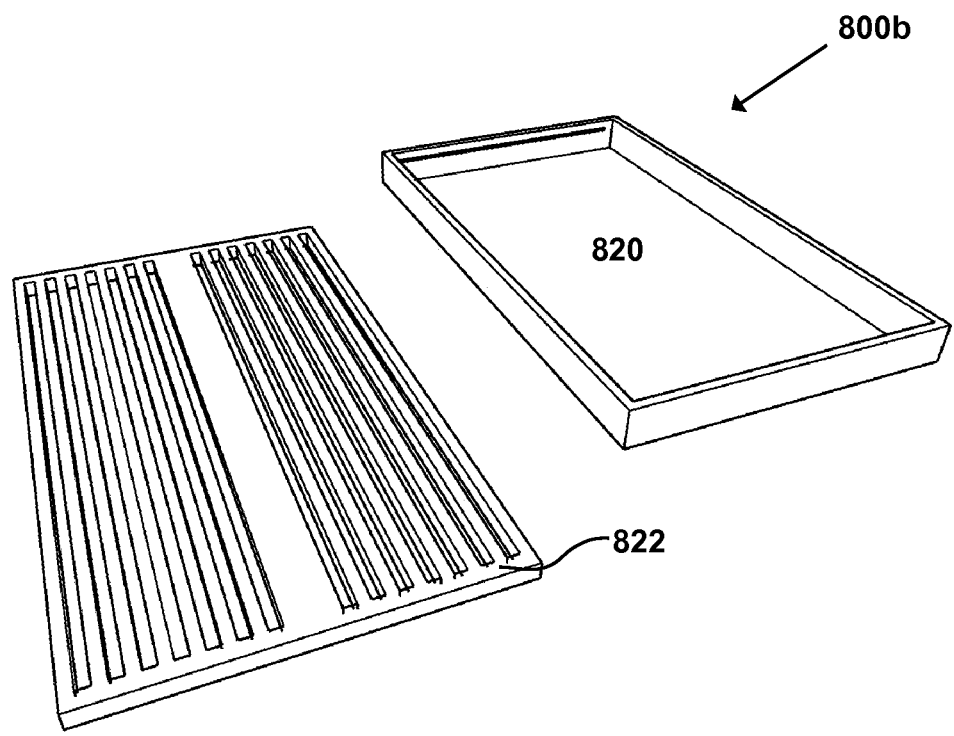
Figure 8C:
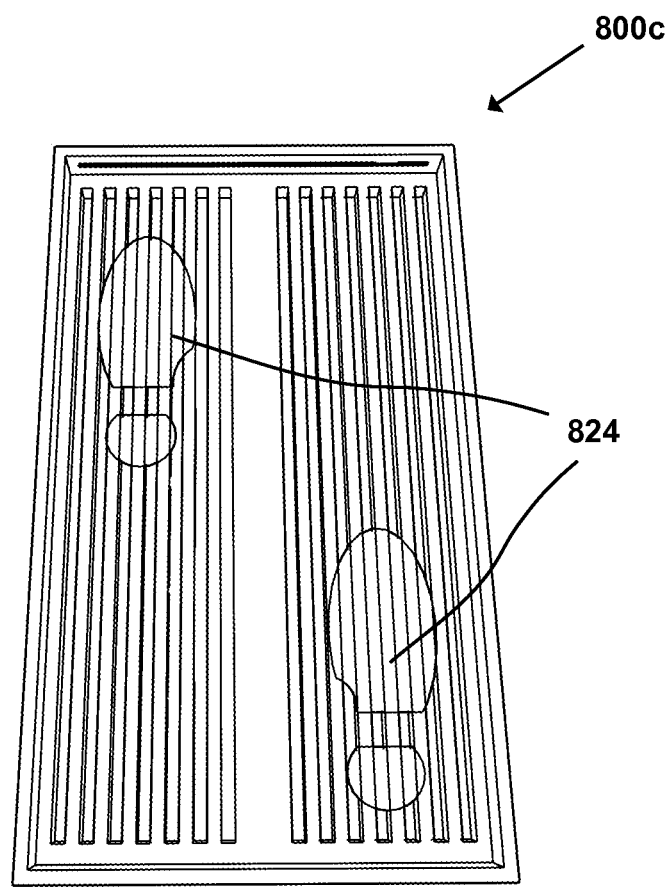

Likewise, an embodiment is contemplated that is primarily for use for cleaning footwear, and that may be particularly suited to commercial and other higher-traffic environments. As illustrated by FIG. 8A, a bath 800a is in this embodiment relatively shallow in depth, while generally providing a broader surface. As illustrated by FIG. 8B, a disassembled bath 800b includes a basin 820 and an upper grid 822, where during use at least a central portion of the grid 822 might be submerged in a cleaning fluid such as water, such that footwear placed thereupon would contact a surface of the fluid. A bath 800 in accordance with this embodiment may be adapted to receive footwear without removing it from its wearer's feet, i.e., the grid 822 may be stepped upon one foot at a time, stepped fully upon, or even walked across, as when placed within a path of travel. To assist unfamiliar users, foot guides 824 as shown in FIG. 8C or other such insignia or indicator might be provided on or below the grid 822, generally indicating where the user should step.

Such an embodiment might find use in the entrance area of a restaurant, for example, such that patrons could walk across the grid 822 upon entering, thereby depositing undesirable material from their shoes or boots into the basin 820, rather than tracking it throughout the establishment. The grid 822 might be further adapted with a rough, corrugated or otherwise slip resistant surface to reduce the risk of injury. In an embodiment in which a bath 800c is tread across by users, an area immediately beyond the bath 800c might further be addressed for safety reasons, such as by placing a rug or other slip-resistant surface, which might further be absorbent or otherwise aid in rapid drying of the soles of the recently-cleaned footwear. Removing melting snow and other material in this manner might improve safety by concentrating a wet area in or near the bath 800c under controlled circumstances, rather than leaving it to be spread throughout the establishment as water and material are deposited at different rates over different paths of travel by different individuals.

Without departing from the scope and spirit of the invention, the concepts as described herein might be varied considerably in their application. For example, while the description often refers to a bath containing water, the use of any of various other suitable fluids is contemplated as well, depending on an application. Likewise, while described primarily for use in a home or other indoor environment, applications are contemplated for use entirely outdoors, such as with respect to garages, sporting venues, etc. In addition, various features of the invention are described with respect to various embodiments. Nevertheless, one skilled in the art will appreciate that many of these features may be combined in single embodiments, although not expressly disclosed as being used together herein. For example, while the embodiment of FIG. 1A is not illustrated as having rollers, one skilled in the art would understand such an embodiment as having been disclosed herein.

While the description herein may refer to specific reference numbers in the figures, the description is likewise applicable to analogous elements having different numbers. For example, descriptions of features of a bath 100 may likewise apply to other baths 200, 600, etc., as would be appreciated by one skilled in the art upon review of the disclosure.

What is claimed is:

1. A device for cleaning, comprising:
an assembly having a bottom having an uninterrupted outer surface and two short sides and a first long side and a second long side forming a rectangular box, the box having a substantially open top, the box forming a watertight basin to be partially filled with a fluid for cleaning;
the assembly including a dip barrier formed on an inner surface of the bottom of the box, the dip barrier being adapted to permit full submersion of soles of footwear during a process of dipping, but to prevent full submersion of a remainder of the footwear; and
the assembly further including a heel hold extending out from the top and along the first long side of the box and a toe hold extending out from the top and along the second long side of the box, the heel and toe holds acting as drying platforms and drip pans angled to direct excess water to run into the basin, at least one of the heel hold and toe hold having raised ridges that allow for greater air circulation under the soles of the footwear while drying;
a pouring spout formed in the assembly;
a cover mechanism comprising a cover coupled to the assembly, a cover guide coupled to the heel hold, and a cover hold coupled to a short edge of the cover; wherein the cover hold is slideably connected to the cover guide such that the cover is slideable between an open position and a closed position, the cover acting as a barrier to accessing the basin when in the closed position, the cover having at least one of raised ridges that support drying footwear to allow greater air circulation during the drying process and slits that allow the fluid to fall into the basin;
a trough formed in the bottom of the assembly, a bottom of the trough being a greater distance from the open top of the box than a remainder of a plane of the bottom of the assembly, thereby effectively increasing a depth of the rectangular box; and
at least one roller coupled to an interior of the box, the at least one roller being adapted to support a bicycle tire;
wherein the assembly is a one-piece molded assembly formed from a single piece of material; and wherein the device is manually operated, without requiring sources of electrical power or water pressure.

2. The device of claim 1, further comprising:
a fill line formed on an inner surface of the box indicating a desired fluid level for use of the device;
the dip barrier including raised ridges, the raised ridges forming channels that act as grit chambers adapted to separate grit removed from the footwear during dipping.

3. The device of claim 1, further comprising:
cover ridges formed in the cover that cooperate with the raised ridges of the at least one of the heel hold and toe hold, the cover being positioned at a downward angle from a distal end of the cover toward a proximal end of the cover, with respect to the assembly.

4. The device of claim 1, further comprising:
a pair of handles formed on opposite sides of the assembly to facilitate carrying of the device by hand.

5. The device of claim 1,
the at least one roller and at least a second roller being positioned adjacent to the trough to support the bicycle tire above the increased depth of the rectangular box.

6. A bath for cleaning a tire and footwear, comprising:
an enclosure having a base and an interior adapted to contain a cleaning fluid, and having an opening for permitting access to the interior of the enclosure, the enclosure being watertight and having a substantially rectangular shape having long sides and short sides, the enclosure having a bottom having an uninterrupted exterior surface;
at least one roller coupled to the interior of the enclosure, for facilitating rotation of a tire rested thereupon during cleaning;
a trough formed in the bottom of the enclosure, a bottom of the trough being a greater distance from the opening of the enclosure than a remainder of a plane of the bottom of the enclosure, thereby effectively increasing a depth of the enclosure;

at least one of a heel hold extending out from a top and along a first of the long sides of the enclosure and a toe hold extending out from a top and along a second of the long sides of the enclosure, the at least one of the heel hold and the toe hold having raised ridges that allow for greater air circulation under soles of the footwear; and a cover mechanism comprising a cover coupled to the assembly such that the cover is slideable between an open position adjacent to the opening of the assembly and a closed position covering the opening of the assembly, the cover acting as a barrier to accessing the enclosure when in the closed position, the cover having raised ridges that support drying footwear to allow greater air circulation during the drying process and that cooperate with the raised ridges of the at least one of the heel hold and toe hold, the cover being positioned at a downward angle from a distal end of the cover toward a proximal end of the cover, with respect to the enclosure;

the bath being manually operated, without requiring sources of electrical power or water pressure.

7. The bath of claim 6, the long sides being approximately 22 inches in length.

8. The bath of claim 6, further comprising:
a dip barrier formed in the base of the enclosure.

9. The bath of claim 6, further comprising:
a pair of dip barriers formed in the base of the enclosure, the pair of dip barriers being substantially parallel to each other and pointed substantially toward a corner of the enclosure.

10. The bath of claim 6, further comprising:
a cover guide coupled to the heel hold; and
a cover hold coupled to a short edge of the cover;
wherein the cover hold is slideably connected to the cover guide such that the cover is slideable between the open position and the closed position.

11. A device for cleaning, comprising:

a one-piece molded assembly formed from a single piece of material and having a bottom having an uninterrupted outer surface and two short sides and a first long side and a second long side forming a rectangular box, the box having a substantially open top, the box forming a watertight basin to be partially filled with a fluid for cleaning;

a cover coupled to the assembly, the cover being movable between an open position and a closed position, the cover acting as a barrier to accessing the basin when in the closed position, the cover having at least one of raised ridges that support drying footwear to allow greater air circulation during the drying process and slits that allow the fluid to fall into the basin;

a hinge coupling a long edge of the cover to the first long side of the rectangular box;

a trough formed in the bottom of the assembly, a bottom of the trough being a greater distance from the open top of the box than a remainder of a plane of the bottom of the assembly, thereby effectively increasing a depth of the rectangular box and creating a region of increased depth of fluid in an area vertically above the trough; and at least one roller coupled to an interior of the box, the at least one roller being positioned adjacent to the trough to support a tire vertically above the trough in the region of the increased depth of the fluid;

wherein the device is manually operated, without requiring sources of electrical power or water pressure.

12. The device of claim 11, further comprising:
at least one of a heel hold and a toe hold fixedly connected to and extending out from a top and along a first of the long sides of the enclosure, the hold having raised ridges that allow for greater air circulation during drying.

* * * * *